Dec. 27, 1932. P. N. ELDERKIN 1,892,487
METHOD OF TESTING MOTORS
Filed March 5, 1929  3 Sheets-Sheet 1
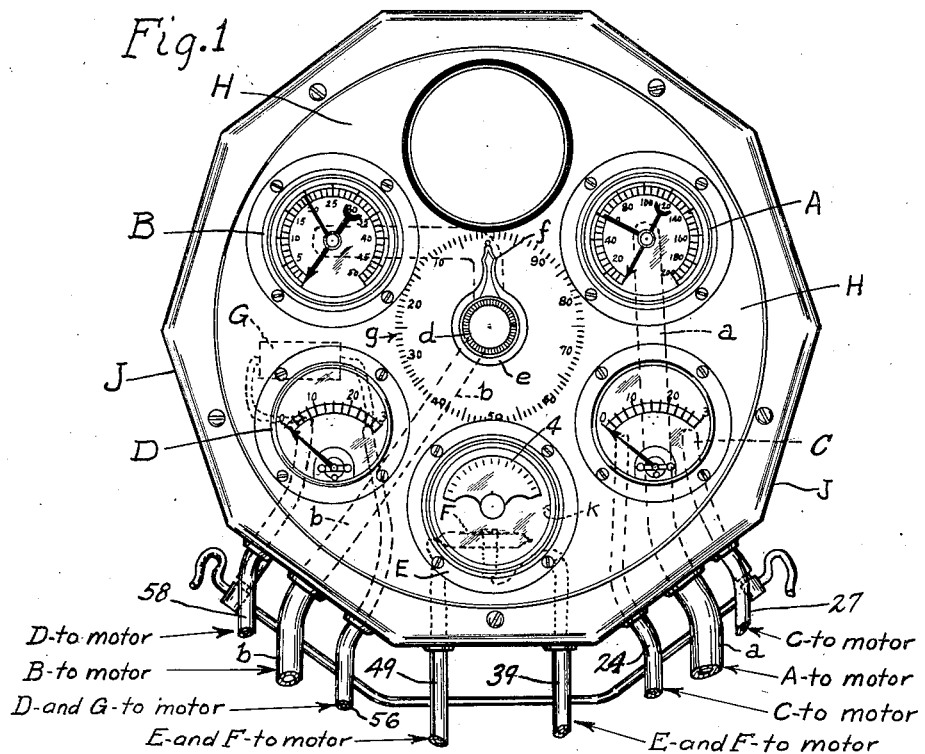
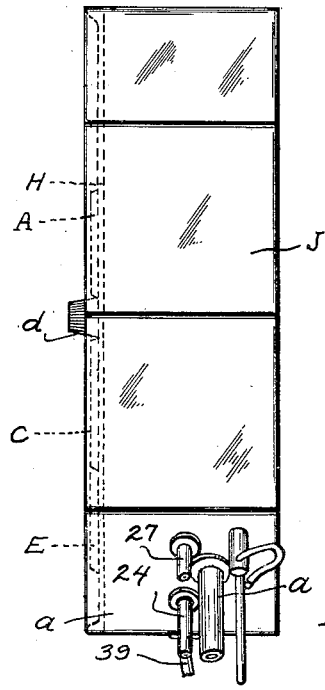
INVENTOR,
PAUL N. ELDERKIN;
ATTORNEY

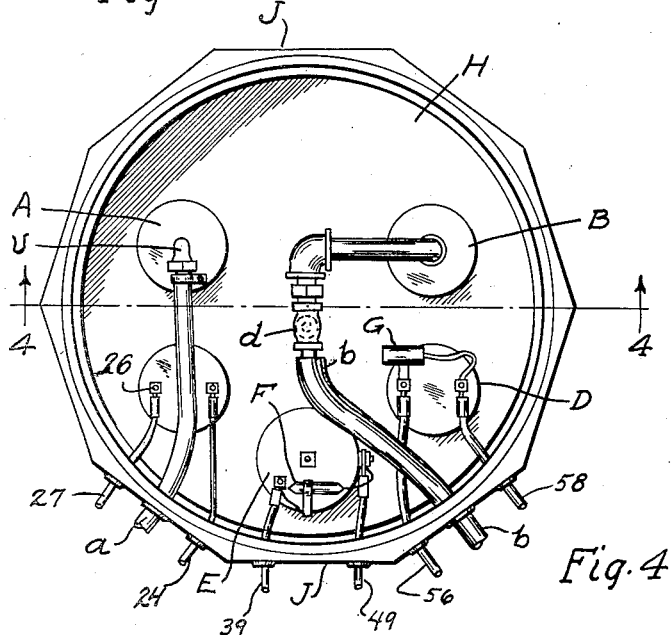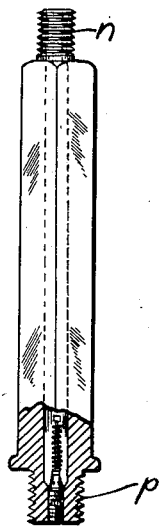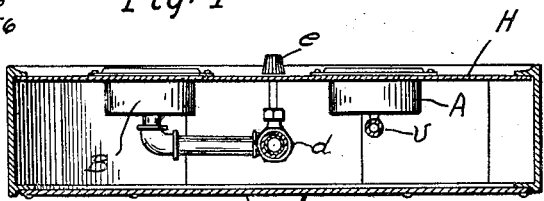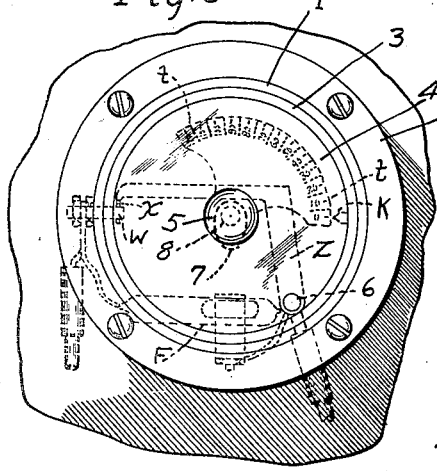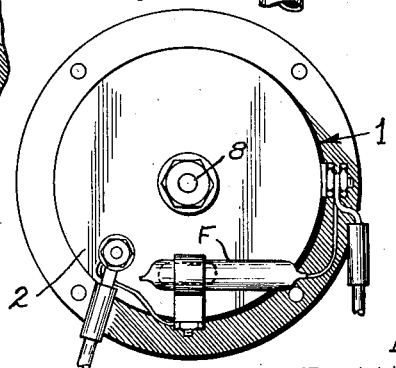

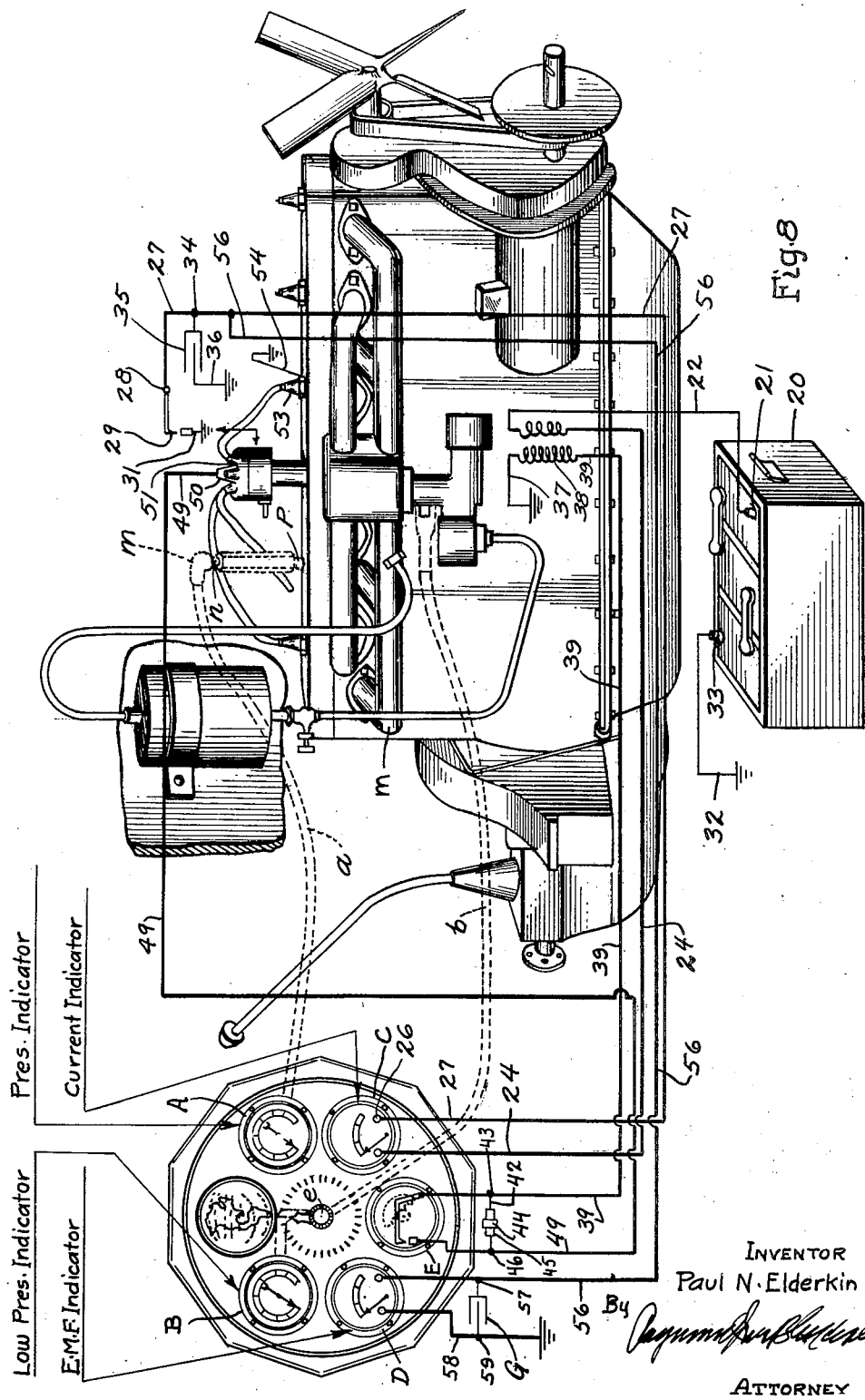

Patented Dec. 27, 1932

1,892,487

UNITED STATES PATENT OFFICE

PAUL N. ELDERKIN, OF LOS ANGELES, CALIFORNIA

METHOD OF TESTING MOTORS

Application filed March 5, 1929. Serial No. 344,539.

This invention relates to a method of testing internal combustion motors, and more particularly electrically fired internal combustion motors, and other mechanism and apparatus, and it has for its object to provide a method whereby, with accuracy and facility, existence of defects in the mechanism and its operation may be determined for purposes of correction.

While the invention is applicable to and adapted for the testing and resultant rectifying and correction and repair of a wide range of apparatus and mechanism, more particularly such apparatus and mechanism in which an explosive charge is electrically fired, the invention has found its field of highest utility in the testing and resultant adjustment and correction and repair of electrically fired internal combustion motors, such as employed in standard practice for driving motor vehicles.

For instance, in electrically fired internal combustion vehicle motors the defects and inefficiencies which are most commonly encountered are as follows:

The mechanical defects relate to the condition of the valves, the cylinders, the piston rings and carburetor. For instance, the valves may be leaky to a greater or less degree; the valve springs may be too weak for the higher engine speeds; the valve adjustment may be so set as to give too late a timing; there may be leakages past the piston rings; also the carburetor may be improperly adjusted for most effective combustion; the muffler into which the exhaust gases pass may be choked with the accumulation of carbon. All of these different defective conditions and their degree, as well as the methods of correcting them, are indicated by employing this method of testing in the utilization of suitable apparatus such as that hereinafter described, and claimed in application filed herewith, Serial No. 344,540.

The electrical firing system which comprises both a low tension current-carrying series of devices and high tension devices may be defective in either the high tension or low tension part of the system. For instance, the leakage from the storage battery, the condition of the breaker points, the failure of the spark coils in the low tension side of the system, may all be determined as well as the failure of the condenser, the breakdown of the high tension spark coil in the high tension system and insufficient connections of its high resistance, leakage between high tension wires, are all quickly detected by the employment of this method of testing the electrical features of the ignition system likewise by the employment of suitable apparatus such as hereinafter described.

While the invention does not necessarily reside in and is not indispensably dependent upon any set or prescribed sequence of steps and performances, excepting possibly in one aspect, still practice of the invention has developed the fact that there is a good preferable sequence of performances or steps which most readily and expeditiously leads to a determination of any defects or inefficiencies such as those hereinabove pointed out, and this sequence of performances is, therefore, preferably pursued as may most conveniently and readily be done in the utilization of such preferred apparatus.

Various objects and advantages of the invention will appear in consideration of the following description and statement, or will occur to those practicing the invention or skilled in the related arts; and the invention consists in the novel and useful provision, selection, aggroupment, sequence and practice of steps and performances, all as hereinafter described, in conjunction with the following description of a perferred apparatus for utilization in practicing the invention, taken in conjunction with the accompanying drawings, and as finally hereinafter claimed.

In the annexed drawings, in which one form of apparatus suitable for practice of the invention is depicted:

Fig. 1 is a plan view of the face of one of the preferred forms of the apparatus, showing the ends of the respective conduits and connectors for suitably connecting the different agencies to appropriate parts of the motor and the electrical equipment.

Fig. 2 is a side elevation of the apparatus mounting which shows a part of the conduits and connectors.

Fig. 3 is a bottom plan, or underside view of the apparatus showing certain control valves, the mounting for the different agencies, the ends of the conduits and connections and a testing condenser.

Fig. 4 is a sectional elevation of the apparatus on section line 4—4.

Fig. 5 is an elevation of an adapter, partly sectional.

Fig. 6 is a plan of the adjustable spark-gap indicator.

Fig. 7 is a bottom plan, or reverse side of the spark-gap device.

Fig. 8 shows a diagrammatic view in isometric perspective of the apparatus with all conduits and connections attached to different points of the motor and ignition system for testing.

In the specific form illustrated in the drawings, the apparatus includes means A for measurement of relatively high pressures; means B for indicating relatively low pressure, or "vacuum"; means C for indicating current flow; means D for indicating electromotive forces, and means E for determining spark-gap conditions which is later described herein. In the arrangement shown in the drawings, all five of the interrelated agencies are located in a circular relationship being angularly disposed around auxiliary valve-regulating means e. The several agencies may be of such a size and so related in the assembly that while easily readable, and accurate in their indications, they may occupy only a small space, and may be of comparatively small total weight and therefore conveniently and easily hand-portable.

As indicated in Fig. 3, the flat plate or disc, H, on which the agencies are mounted constitutes the front wall of a holder or container for the agencies. The connecting tubes and wires pass from their respective agencies to appropriate locations on the motor or to the several electrical parts and there are connected to the elements on which observations are to be made; these said connecting parts, or flexible tubes and wires, passing through the side of the vertical members of the container or holder as indicated in the figures.

Some of the separate cooperating agencies, which are included in the apparatus, while somewhat similar to known types of pressure gauges, electrical instruments, and the like, have some special arrangement or construction which adapts them for the especial and cooperative uses for which they are employed.

The means A is connected with any cylinder of the motor to be tested, by screwing the brass fixture m at the outer end of the tube a, over the outer threaded nipple n, of an adapter, such as is shown in Fig. 5. Several adapters are supplied with the apparatus. The outer nipple end n, of the adapter which screws into the brass fitting m, on the end of the flexible pipe a is the same size for every adapter, but the inner threaded nipple p, of each adapter differs in size and threading from any of the others, there being an adapter having an inner nipple p, to suit each kind or make of spark-plug hole. In making pressure tests on any motor, the means A may be quickly connected to any cylinder thereof, by simply screwing out the spark plug and screwing in its place the nipple end p, of an adapter which fits in the spark plug hole. A check-valve in the adapter permits flow in one direction only, viz: outwardly, or away from the motor so that when the highest pressure is indicated in the cylinder to which the tube and its agency are connected, and the further movement of the motor piston diminishes the pressure, the reading of pressure on the suitably actuated indicating needle does not fall, but the maximum pressure, only, is registered. A needle valve v, or equivalent constriction, is placed in the pipe line near the apparatus in order to prevent oscillation of the needle under quickly changing pressures; in other words, to make the indicating pointer "dead-beat". Low pressure, or "vacuum" indicating means B is arranged to have the flexible pipe b, thereto attached, connected to the intake manifold, through an opening either previously made for the purpose, or that whereto the "vacuum feed" device is connected, may be used. There is a constricting valve d in the tubular conducting line from the manifold, immediately near the apparatus, which valve is controlled by a large button, or twisting member e, as shown. Attached to this member e is a pointer, or needle f, which revolves around a circle g, engraved on the supporting plate and on which are graduations, usually from 0 to 100. The graduations have no specific meaning, but serve to indicate, for any particular constricting valve, the approximate point where the related indicating needle becomes quiet and stops quivering under variable pressures.

The electrical indicating means C and D are constructed in accordance with the d'Arsonval galvanometer principle. Connected in parallel with the electromotive force indicator D is condenser G, as shown. The spark-gap device E is especially arranged, designed, calibrated and connected for the apparatus.

The adjustable spark gap device has an indicator t, which shows, not the actual distance apart of the electrodes, but the equivalent of the distance between them related to the compression pressure of the cylinder in which the spark plug is to operate. It is a well-known fact that the greater the ambient pressure in which a spark-gap works, the greater must be the voltage to send an electric current from terminal to terminal across a fixed gap. Hence, a spark plug, tested at atmospheric pressure, may spark under the available voltage while, under the compression at which firing occurs, the same voltage may not be able to force the current to jump the gap. It is by this method, of first finding the maximum compression pressure by use of agency A and then fixing an equivalent gap, at atmospheric pressure, to determine whether the available electromotive force is sufficient to produce sparking under actual operating pressure, that the testing apparatus is made completely useful and suitable for diagnosing these parts of a motor ignition system.

Cooperating with this specially calibrated spark-gap and connected permanently in parallel therewith, is another specially designed device or agency F, which comprises a small glass tube filled with a gas at an attenuated pressure, in fact only a fraction of the normal atmospheric pressure, and in which an electrode has been sealed at one end. A conductor passing out through the end of the tube provides a terminal to which connection can be made from a source of external electrical pressure to the electrode inside of the tube, so that this electrode with its attached conductor, forms one electrode. Near the end opposite from the electrode end, the tube has a band, or strap, of metal, partially surrounding it which forms a support for the tube and acts as an electrode for the device, the passage of current being, of course, from inner electrode to attenuated gas, thence, by induction through the dielectric (glass) of the tube, to the outer strap or terminal.

Obviously, a considerable flow of current across the spark-gap of agency F, will indicate a considerable electromotive force across the terminals thereof, and, since this same electromotive force is coincidently applied to the terminals of the tube F, a flow of current will take place through the gas-filled, transparent device, so that the attenuated gas contained therein, will glow, the degree of its luminosity being proportional to the quantity of current and, therefore, to the impressed electromotive force. Hence, by observation of the glass tube, when a voltage is applied to its terminals, some general idea of the said voltage may be obtained.

From this it follows that when the spark-gap elements are separated a distance equal to the normal separation of spark plug elements, plus such additional distance as is equal to the increased resistance proceeding from the compression of the ambient gases, the voltage necessary to cause sparking across the gap, will be great enough to produce a considerable flow through the gas-filled tube and make it glow. Hence, the indications of this agency are additional to the separations of the spark-gap elements, and observation of the degree of brilliancy, coincidently with the observation of the sparking across the gap—its uniformity, and failure to cease or diminish—assists in determining the strength of the electromotive force which is provided by the igniting system of the motor plant.

This sparking indicator is more clearly shown in Figs. 6 and 7. A case, 1, having a bottom, 2, surrounds and supports the members and parts. The case is preferably cylindrical with a cover, 3, in which latter is fixed a transparent disc 4 so that the interior of the instrument may be observed therethrough. The spark-gap is made up of the two members $w$ and $x$, whereof the latter is adapted to be moved by the turning of a twisting member, 5, while $w$ is fixed in position. $x$ is the end of a movable arm $z$ pivoted at 6, which arm is arranged to rotate about 6 by turning of the member 5. While any suitable form of mechanical connection may be used for causing the arm $z$ to rotate about pivot 6, and, by its rotation, to change the spark-gap, the present preferred arrangement is that of a cam 7, mounted on the vertical shaft 8, as indicated by the dotted lines. As before explained, the graduated arc $t$, on sector 9, attached to shaft 8, and, therefore, which revolves with 8, is graduated to show, by its relation to the fixed pointer $k$, a distance apart of the gap electrodes having a resistance to passage of current equivalent to that of a normal spark plug gap surrounded by a considerable pressure. Hence, by turning twisting member 5 and with it, the shaft 8, until the reading on the sector $t$, corresponds with the previously found pressure in the cylinder of the motor under test, the actual distance apart of the two gap elements $x$ and $w$ is in excess of the normal separation distance of the two spark-plug electrodes by an amount which is equal to the difference between the resistance of the spark plug electrodes under the pressure found, and that which would exist under atmospheric pressure. This means, of course, that the separation of the gap parts $x$ and $w$ is greater than the actual separation of the spark plug parts, in order to make the two different gaps of equivalent resistance to passage of current.

The adjustable spark-gap and glow-tube are so located that they are visible simultaneously, they being arranged for vision at the same instant and by the same observation. This device operates in conjunction with the compression agency A by first testing the compression of the cylinder, with its valves and connections. Then the spark-gap is set so that the number on the sector $t$, opposite the pointer $k$, indicating pressure, is identical with the pressure as found by the compression test agency. Then, if the electrical equipment will pass sparks through the gap and, simultaneously, illumine the glow-tube, this proves that the electromotive force is sufficient to produce a good spark under actual operating conditions and cylinder pressures.

As an indication of the use of this novel combination of agencies, a few of the tests for which it may be employed are set forth.

To determine the condition of the piston and valves of any one cylinder unit, the compression agency is first connected with the spark-plug opening of the particular cylinder under observation, as shown in dotted lines in Fig. 8. The motor is then rotated at a slow speed by an external agency, usually the electrical starter. On the compression stroke the degree of compression will be indicated on the instrument A and if piston rings and valves are all tight and in good condition, the maximum pressure indication will equal that which was originally produced in the cylinder when the car was new and which is, usually, a known quantity. Generally, however, the maximum pressure attained will be considerably less than that when the car was new. This proves only that leakage occurs but does not indicate the locality of such leakage. By removing the tube connector a, and the adapter, from the spark-plug hole a specially heavy oil is ejected into the cylinder with an oil can, having a long curved spout, so that any leakage past the piston rings is practically sealed, the instrument is re-connected to the same cylinder and, by external means, the motor is again rotated. If the pressure observed on this second test is higher than that observed on the first test, the difference, or increase, is obviously that which proceeded from loss around the piston rings, now eliminated. Therefore, the amount of this loss is now definitely shown. By subtracting this known loss from the previously found total loss, the remainder is clearly that due to valve leakage. If the admission valve be ground so that it is definitely tight and without leak, and a third test is made, it is obvious that, from the last set of test figures obtained, any leakage past the exhaust valves will be definitely shown.

A certain degree of familiarity with the apparatus must be attained before rapid and accurate diagnosis of all the parts of the motor can be made. For instance, if the low pressure, or vacuum, indicating means is connected with the engine intake manifold, the needle or pointer will move with changes in pressure in the manifold. If the motor be slowly turned over by some external means and it be found that at a certain point in the rotation the needle reaches some value and then slowly sinks back to some lower value, this is an indication of a leaky valve. If a mere leaky valve, the rate of pressure drop and its degree, will be comparatively small, say 4 or 5 divisions in 5 to 10 seconds.

If, however, the valve is badly distorted, usually called a "burnt" valve, the rate of pressure change and its degree are far greater.

If the needle oscillates on both sides of some value which it reaches and the rate of oscillation increases with the speed of the engine, this is a definite indication of one or more weak valve springs. If the same oscillation is observed but the movement is slow, and independent of the engine speed, this shows a need for carburetor adjustment and as the adjustment is made the needle will fluctuate more or less depending upon whether the direction of the adjustment is towards or away from the corrective direction of adjustment. From this can be determined the direction of change in the adjustment, and if the adjustment be continued until the needle becomes steady, then the carburetor has been perfectly adjusted.

These are simply examples of tests which may be made with this single agency of the apparatus, there being actually eight separate and definite indications obtainable from it, and when the defects it shows are corrected, the needle will reach some point, near the middle of the arbitrary scale, and there remain without movement in either direction.

There are also tests for the combined low pressure agency and the other agencies as mentioned later herein.

The electrical agencies, including standardized condenser G, connected in parallel with electromotive force indicator D, and the adjustable spark-gap E, with its special calibration and the luminous tube F, connected in parallel with it, are used to test the condition of the various electrical parts of the engine ignition devices. By these coordinated agencies, practically any defect in the motor, or the electrical equipment provided for the ignition of the gases, can be quickly, surely and definitely determined.

In Figure 8 is shown one of the methods of connecting the apparatus with the different parts of the motor and its electrical firing equipment for making certain of the tests, of which this apparatus is capable. The conducting tubes a and b which lead from their respective pressure indicators A and B are shown in dotted lines in order to indicate the method of using these particular devices. These tubular conduits are seldom connected with the motor at the same time that the other devices are, and for this reason, and in order to show the several points and methods of connection, tubes a and b are dotted in to indicate that they are not in use, or connected with the motor, when the other portions of the apparatus are applied to the variety of tests for which they are adapted.

The pressure-indicating agency A, is connected with any cylinder of the motor, as previously explained, by removing a spark plug, substituting an adapter (see Fig. 5), and connecting the conduit a, with the adapter as shown in the dotted lines. Likewise, the low-pressure indicating agency B is connected to the motor manifold M, through tubular conduit b, which usually is fastened to the opening made for the reception of the vacuum feed. This connection is likewise indicated in the dotted lines.

For the electrical determinations covering investigation of the condition of the spark plugs; the condition of the condenser connected with the motor breaker; the current output passing through the primary coil and the breaker; the condition of the spark coils, both primary and secondary; the condition of the breaker points and such similar tests, the connections are shown in Figure 8. The different operating parts of the electrical firing system are diagrammatically indicated and are disposed in position arbitrarily and in such manner as to make the conduits more easily traceable, the locations of these said parts not conforming in any manner to the actual positions of such parts either in a stationary motor equipment or that of a gasoline-driven motor car. 20 is the battery, 21 the positive terminal, 23 the primary of the spark coil connected to the terminal 21 of the battery by wire 22. The other end of the spark coil 23 is connected by wire 24 to the current indicating agency C and the return circuit from this agency begins at terminal 26 thereof and is carried by wire 27 to the breaker member 28 having the contact point 29 which cooperates with the other contact member 30. The latter is connected to a common conductor, such as a motor-car frame, or the ground, by wire 31. The other terminal of the battery 33 is connected by wire 32 to the same common conductor, or ground, as indicated. Obviously, potential of breaker contact element 30 is identical with that of battery terminal 33. The wire 27 also connects with condenser 35, it branching at point 34 to this latter device so that one terminal of the condenser is at the same potential as breaker point 29. The opposite terminal is connected by wire 36 to ground so that the condenser is connected across the two breaker points. By tracing these circuits it will be found that there is a complete circuit from the battery through the primary coil through the current flow indicator, thence through the breaker and back to the opposite pole of the battery. This part of the system is customarily of low voltage, the standard being six volts, and all of the parts and wiring are, constructed, designed and insulated for this low potential.

The high potential side of the system begins with secondary coil 38 connected at one end by wire 37 to ground, and at the other end by wire 39 to the combined spark-gap and glow-tube apparatus E. The circuit passing through this combined agency returns through wire 49 to the distributor 50, the connections being arranged so that this distributor is in series with the high-tension line passing through both the spark-plug and the spark-gap agency E, as will be seen by following the circuit from wire 49 where it enters distributor 50, passes out of one of the distributor openings 51 and by wire 52 goes to spark-plug 53, which latter has one side grounded by the mere fact that it is screwed into the metal of the motor, but it is here indicated as connected with ground by wire 54. Obviously, the upper end of the high-tension secondary coil is at the same potential as one spark-plug electrode and the high tension induced in this secondary coil by the action of the breaker is absorbed by driving the current through the circuit which includes the spark-plug gap plus the spark-gap testing device E, and the glow-tube; the two latter being in parallel and this parallel pair being in series with the spark-plug.

An additional connection is that of the electrical pressure-indicating agency D, having connected in parallel therewith the standardized test condenser G. The circuit across which these two agencies are connected begins on one side at ground, wire 58 connecting these two instruments to ground on one side; while wire 56 connects the other side of this pair of agencies to breaker element 28 and breaker contact point 29, wire 56 joining with wire 27 at junction point 55. Obviously, the side of the pressure-indicating agency, D, connected with ground is at the same potential as that of breaker contact point 30 and also of one side of the condenser 35. Hence the two condensers 35 and G, the former of which is a part of the motor apparatus, the latter a portion of the test apparatus, are connected in parallel.

While it is not the intention to extend this specification and make it unnecessarily long by describing all of the possible tests, it is suitable to indicate a few which will indicate the utility of the apparatus. One of the tests is to determine the condition of the condenser 35 used in the motor ignition system. These condensers are subject to deterioration and may be defective even when new. To be in good operating condition they must have a reasonable capacity for the function they are to perform, namely, to permit substantially instantaneous breaking of the arc between the breaker points; must be free from leakage, grounds or other defects. Without the condenser, the voltage induced in the secondary coil by the opening of the breaker points would be comparatively small. The voltage is induced by reason of the change in the current flow through the primary coil, and the more rapid this current change the greater will be the voltage induced in the secondary, high-tension coil. If no condenser were connected across the breaker points the interruption of current flow would be comparatively slow, in fact might not take place at all, because as the breaker points begin to separate the tendency is for the current to flow across the gap and form an arc, just as in the case of an ordinary arc lamp. This might be sufficient to permit current flow to continue throughout the period of separation of the two breaker elements. At any rate this tendency to form the arc would persist over a portion of the path of separation of the two breaker elements, which means that the time period of current interruption would be comparatively low. As is well known in the art, a condenser connected across a break of this character tends to extinguish the arc or prevent its formation and cause an almost immediate cessation of current flow when the breaker points begin to open. Therefore, a faulty condenser or one of insufficient capacity will tend to prolong the time of current flow and thereby diminish the voltage in the secondary coil.

With the connections made as indicated in Fig. 8, the variable spark-gap device E, is set with the contact closed, so that it interposes no resistance, or spark-gap, in the circuit, and the ignition system is in its normal condition for operation. The first act of testing comprises starting the motor and running it idle at about 250 R. P. M. While running, temporarily disconnect one of the wires to the agency D, either wire 56 or 58. Then begin to open the spark-gap in the agency E, so that the resistance to current flow is thus gradually increased. Continue to open this spark-gap until there appears to be a skip or failure in engine firing on one or more cylinders. Obviously, when this condition occurs the resistance to current flow through the path which includes the spark-gap of agency E, and that of the spark-plug, has become so great that the voltage of the system is just able to pass necessary firing current through some of the spark-plugs. When this condition is obtained the temporarily removed connection from the agency D, say wire 58, is restored. When this is done it means that the condenser G connected with agency D, is connected in parallel with the condenser 35, so that, regardless of the characteristics of condenser 35, a standard condenser is now connected across the breaker points. If, under this condition, the previous skip, or failure of some of the spark-plugs to fire, ceases, and the firing again becomes smooth, normal and regular, this change will be obviously due to the interposition of the condenser G in the circuit, and this, of course, is proof of the insufficiency of condenser 35.

While a description of the connections and this one test have occupied considerable space, in the hands of an expert this apparatus is connected, the tests made and the determinations therefrom reached, within a very short period of time and which is in no wise related to the length of this explanation.

With this same series of connections, tests of the ignition coils may be made. These coils, just as are condensers, are subject to deterioration, and may be defective when new, and many failures of internal combustion engines to give sufficient power are due to defects in the spark coils. In order to test these coils it is first necessary to connect agency A through tubular conduit a, and adapter to the different cylinders of the engine successively as before explained and in the manner before described to determine the maximum compression pressure obtainable from each cylinder. When this is done the tubular connector a, and adapter are removed, the spark-plugs are replaced and the motor is started and run at the usual idling speed, about 250 R. P. M. At the time of starting the motor, the spark-meter agency E is set with the two elements thereof in contact so that it interposes no gap or resistance in the circuit and the electric ignition system operates as usual. After the motor has been brought up to idling speed and has run a few seconds, the spark-meter dial is turned until the pointer indicates on the graduated segment the figure representing the compression as obtained from the previous test. The spark-meter gap, and the luminous glass tube are both observed. If the spark across the gap is continuous and free from skips, and the flash in the gas tube is continuous and bright, then this test shows that the coils are in good condition. But if the sparks across the gap skip or falter, and the glow in the tube becomes darkened, particularly near one end, the coils are defective. If the engine stops, of course, this is an indication that the coils are wholly unusable in any manner.

The more important tests which can be made rapidly and quickly with this novel apparatus are (1) ignition coil tests; (2) ammeter tests; (3) location of short circuits, open circuits and grounds; (4) determination of condition of breaker points; (5) a test of the storage battery, its condition of charge and location of weak cells; (6) condition of condensers; (7) condition of each spark plug; (8) determination of condition of high-tension conductors particularly with respect to leakage. (This is a common fault, is a frequent cause of unsatisfactory operation, and, usually difficult to locate, but is indicated almost immediately by the use of this apparatus); (9) condition of valves showing whether they are burnt, distorted, leaky, sticky, whether they have loose valve guides, weak valve springs or late timing; (10) adjustment of carburetor; and (11) test of condition of pistons. Of course, other forms of tests will suggest themselves to those skilled in the internal combustion engine and affiliated arts.

But certain of the tests require the use of more than one agency. For instance, as before mentioned, in determination of the ignition voltage of the electrical system abd its sufficiency or inadequateness, it is first necessary to find the maximum compression by use of the compression indicating means, then set the spark-gap adjustment to correspond with this determined pressure and from the behavior of this spark-gap and electrically attached luminous tube, to determine the sufficiency or inadequacy of the oscillatory or pulsating voltage impressed on the spark plugs.

It is obvious, therefore, that this final result is obtainable only by two successive tests made through agencies arranged in juxtaposition for such trials.

It is obvious that the practice and utilization of the invention is not necessarily dependent upon the utilization of any specific apparatus or instrument, although the apparatus hereinabove disclosed and shown in the drawings is highly effective for such purposes; and the invention, therefore, is not to be limited in any respect to any particular kind or character of instrumentality for use in such behalf. Nor is the invention to be limited to the exact character and nature as herein described and disclosed of any particular step or performance or to any exact controlling sequence of such steps and performances; but many variations, additions, substitutions and re-arrangements or selections thereof or changes in the sequence thereof may be indulged in without departing from the broad spirit of this invention.

Having thus disclosed my invention, I claim and desire to secure by Letters Patent:

1. The method of testing a high tension ignition system of an internal combustion engine to determine the efficiency of the usual condenser included in such system, which consists in imposing a variable resistance in the circuit including the condenser, increasing said resistance until a skip or failure in firing of one or more of the cylinders of the engine occurs, and while maintaining said resistance in the circuit interposing another condenser in the circuit.

2. The method of testing a high tension ignition system of an internal combustion engine to determine the efficiency of the usual condenser included in such system, which consists in imposing a variable resistance in the circuit including the condenser, increasing said resistance until a skip or failure in firing of one or more of the cylinders of the engine occurs, and while maintaining said resistance in the circuit interposing another condenser in the circuit in parallel with the condenser of the system.

In testimony whereof, I have signed my name to this specification at Los Angeles, Calif., this 19th day of February 1929.

PAUL N. ELDERKIN.